H. J. HOYT.
FABRIC DISTORTING DEVICE FOR TIRE BUILDING MACHINES.
APPLICATION FILED FEB. 10, 1915.

1,209,161.  Patented Dec. 19, 1916.

Witnesses:
Veronica Braun
Francis Boyle

Inventor
Homer J. Hoyt.

By his Attorney
Ernest Hopkinson

UNITED STATES PATENT OFFICE.

HOMER J. HOYT, OF DETROIT, MICHIGAN, ASSIGNOR TO MORGAN & WRIGHT, A CORPORATION OF MICHIGAN.

FABRIC-DISTORTING DEVICE FOR TIRE-BUILDING MACHINES.

1,209,161.

Specification of Letters Patent.

Patented Dec. 19, 1916.

Application filed February 10, 1915. Serial No. 7,252.

*To all whom it may concern:*

Be it known that I, HOMER J. HOYT, a citizen of the United States, and a resident of Detroit, county of Wayne, and State of Michigan, have invented certain new and useful Improvements in Fabric-Distorting Devices for Tire-Building Machines, of which the following is a full, clear, and exact description.

This invention relates to tire building machines, more particularly to an apparatus for stretching fabric and delivering the same in stretched condition to the ring core upon which the tire is to be built.

An object of the present invention is to provide an extremely simple and effective device embodying two sets of rollers, between which the fabric passes on the way to the ring core, one set being positively driven at a predetermined ratio of surface speed relatively to the other set whereby a longitudinal stretch is produced in the fabric as it travels between said sets of rollers.

A further object is to provide an apparatus of this type which will be frictionally driven from the ring core whereby as the carcass increases in thickness the stretch produced by the device will be maintained uniform throughout the various plies of the carcass.

With the above object in view the invention consists in certain novel details of construction and combinations of parts hereinafter fully described and claimed, it being understood that various modifications may be resorted to within the scope of the appended claims.

Figure 1:
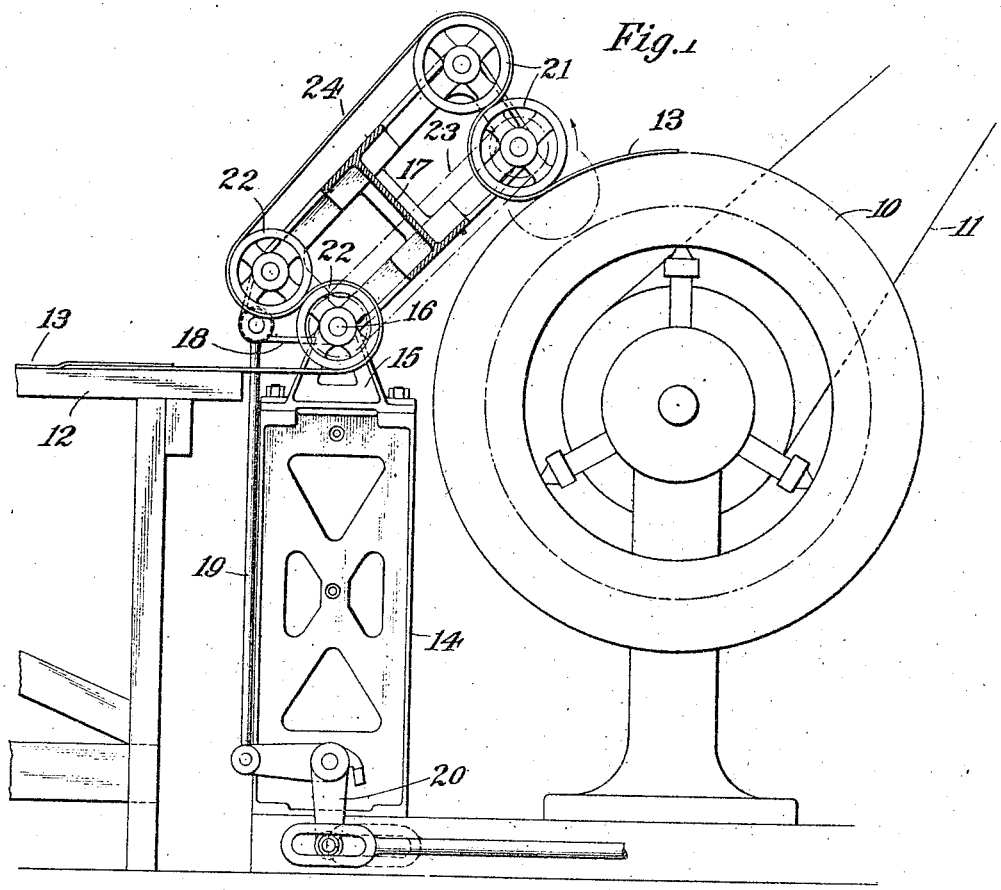
Figure 2:
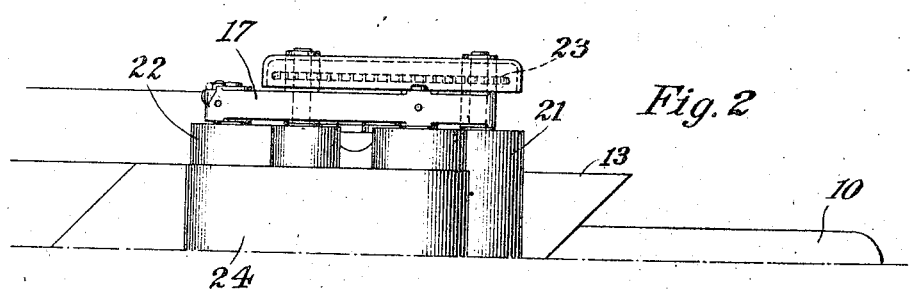

The invention will be readily understood from the following description taken in connection with the accompanying drawings in which:

Figure 1 is a side elevation partially in section of a fabric stretching and applying device embodying the invention; Fig. 2 is a plan view of a vertical, medial section of the apparatus shown in Fig. 1.

Referring now to the drawing in which like characters of reference designate similar parts, 10 designates a ring core of the usual and well known type, the same being power-driven by suitable drive mechanism such for instance as shown at 11.

In carrying out the invention I provide a support such as a table 12 along which the bias cut spliced strips of fabric 13 pass in a continuous sheet on the way to the ring core. Between the end of this support and the ring core a fabric stretching and delivering device is mounted and receives the sheet of fabric 13, stretches it to a pre-determined degree, and finally applies the fabric in stretched condition to the surface of the core. The preferred embodiment of this device will now be described.

The device comprises an upright support 14 to which are bolted bearings 15. A shaft 16 is journaled in these bearings. A frame 17 of the general shape shown in Fig. 1 is pivotally secured at one corner to this shaft 16 and is provided at the rear end with a bracket 18 that is pivotally connected with a shift rod 19 by means of which the frame may be rocked on the shaft substantially radially toward or away from the ring core. The rod is moved by a lever mechanism designated in general by the numeral 20.

Mounted at the free end of the frame are a pair of rolls 21, and mounted at the rear end of the frame are a pair of rolls 22, the latter being positively driven from the former by means of a chain drive 23 so that the surface speed of the rolls 22 is less than the surface speed of the rolls 21. The rolls 21 are frictionally driven from the ring core 10 at substantially the same peripheral speed as the latter. The fabric passes from the table 13 over the rolls 22 and from thence to and over the rolls 21, thence to the ring core. Since the rolls 21 are driven at the same surface speed as the ring core they deliver the fabric as fast as the ring core can take it on, but since the rolls 22 are driven at a less surface speed than the delivery rolls 21 the former feed the fabric to the latter slower than the latter can take it on, consequently, there is produced a corresponding stretch in the fabric as it travels across the intervening space between both sets of rolls, namely, at the part marked 24. It is obvious that this differential of surface travel of the rolls 22 with respect to the delivery rolls 21 may be obtained by a differential of diameter while the rolls travel at the same rate of revolution, or may be obtained by decreasing the rate of revolution of the rolls 22 and making these rolls of the same diameter as the delivery rolls 21. In the present embodiment the former condition is illustrated, namely, the delivery rolls are of larger diameter than the rolls 22, while both sets of rolls have a uniform rate of revolution.

It will be noted that the weight of the frame 17 presses the delivery rolls 21 into operative engagement with the power-driven ring core for frictional driving thereby, and that as each ply of fabric is laid on the core the delivery rolls will be driven thereby and thus partake of increased surface speed as the layers accumulate, consequently increasing the surface speed of the rolls 21 a proportional amount so that the stretch imparted to the fabric by the device is maintained uniform for all the different plies laid on the core.

I do not limit myself to the shape of the rolls as illustrated, as the rolls may be crowned to give a center stretch or may have a narrow bearing section in the center for the same purpose.

What I claim and desire to protect by Letters Patent is:

1. A tire building machine embodying a power-driven ring core, a pivoted frame, rolls thereon for delivering the fabric to the core, means for rocking the frame to dispose the delivery rolls for frictional driving by the core, and positively driven rolls on the frame for feeding fabric to the delivery rolls at a predetermined ratio of speed relatively to the speed of the delivery rolls.

2. A tire building machine embodying a power-driven ring core, a support, a frame pivoted at one end to the support, delivery rolls at the free end of the frame, rolls on the frame for feeding fabric from the support to the delivery rolls, and spaced from the delivery rolls and positively driven from the delivery rolls at a predetermined ratio of surface speed relatively to the surface speed of the delivery rolls, and means for rocking the frame to dispose the delivery rolls for frictional driving by the core.

Signed at Detroit, Mich., this 20th day of January, 1915.

HOMER J. HOYT.

Witnesses:
JOHN CARLSON,
J. H. SWIFT.